United States Patent Office 3,803,139
Patented Apr. 9, 1974

3,803,139
SPARINGLY SOLUBLE HETEROCYCLIC
COMPOUNDS
Bans Lal Kaul, Basel, Switzerland, assignor to
Sandoz Ltd., Basel, Switzerland
No Drawing. Filed Oct. 14, 1971, Ser. No. 189,394
Claims priority, application Switzerland, Oct. 21, 1970,
15,427/70; Oct. 22, 1970, 15,604/70
Int. Cl. C07d 93/12
U.S. Cl. 260—243 R                  14 Claims

ABSTRACT OF THE DISCLOSURE

Bis - [(2H) - 1,4 - thiazin - 3 - on - 2 - ylidenes] acid and sulfonic acid groups are novel valuable pigments with high migration and light fastness. They exhibit also high tinctorial power, transparency and heat stability.

This invention relates to a process for the production of compounds of the bis-[(2H) - 1,4 - thiazin-3-on-2-ylidene] series. These new indigoid compounds, which are free from water solubilizing substituents, are eminently suitable for use as pigments, especially for the mass pigmentation of plastic materials. They are generally of formulae (I) or (Ia)

The indigoid pigments disclosed herein can be produced by the condensation of 2 mols of a compound of formula (II)

devoid of carboxylic acid or sulphonic acid groups, or if required, 2 mols of a mixture of compounds of this formula, with 1 mol of a compound of formula $$Hal-C-COR_4 \quad \text{or} \quad Hal-C-COR_4$$
$$Hal-C-COR_4 \quad \quad R_4OC-C-Hal$$
(III) (IIIa)

In Formulae I and Ia, II, III and IIIa, $R_1$ in each instance stands for the groups necessary to complete formation of an aromatic carbocyclic ring system or a heterocyclic ring system, either of which may further bear substituents, $R_2$ stands for hydrogen or alkyl or aryl, which may also bear substituents, $R_3$ stands for hydrogen or a metal equivalent, $R_4$ stands for hydroxyl or alkoxy or the two $R_4$ symbols jointly for oxygen, and Hal stands for chlorine or bromine.

The preferred radicals $R_1$ include radicals of formulae (benzodihydro-   (naphthodihydro-   (anthraquinodi-
thiazines)       thiazines)         hydrothiazines)

In the aforementioned naphthathiazines and anthraquinothiazines the fusion may also take place in the 1,2 instead of the 2,3 position.

Preferred substituents are halogen, nitro, cyano, alkyl, alkoxy, amino, alkylamino, alkylthio, phenoxy, phenylamino, phenylthio, acyl, acyloxy and acylamino groups. All the alkyl substituents of the molecule including the alkoxy, alkylthio and alkylamino groups contain preferably from 1 to 4 carbon atoms and may in turn bear substituents such as halogen, cyano, alkenyl, alkoxy, amino, alkylamino, phenyl, phenoxy, phenylamino, acyl, acyloxy or acylamino.

"Halogen" stands for fluorine and in particular chlorine and bromine, but the trifluoromethyl group can also be equivalent to halogen. Alkylamino and phenylamino include N,N-dialkylamino and N,N-diphenylamino as well as N-monoalkylamino and N-monophenylamino. If $R_2$ denotes phenyl, this phenyl radical may likewise bear any of the aforecited substituents.

The preferred acyl groups are of formula R—Y— or R'—Z—, where

R represents a hydrocarbon radical which may bear the aforenamed substituents and/or hetero atoms, preferably an alkyl or phenyl radical, unsubstituted or substituted as preferred, Y represents a radical —O—CO— or —SO$_2$—, R' a hydrogen atom or R, Z a radical —CO—, —NR"CO— or —NR"SO$_2$—, and R" a hydrogen atom or R.

Specifically claimed are compounds of general formula (IV)

or (IVa)

in which $R_2$ has one of the aforestated meanings but is preferably hydrogen and the radicals $R_5$ to $R_8$ or $R_5'$ to $R_6'$ stand for hydrogen, halogen—primarily chlorine or bromine, a lower alkyl group having 1 to 4 carbon atoms—primarily methyl or ethyl, a lower alkoxy group having 1 to 4 carbon atoms—primarily methoxy or ethoxy, or the trifluoromethyl group.

The reaction scheme leading to the new compounds of this invention is as shown below, where the reaction with fumaric acid derivatives is taken as an example:

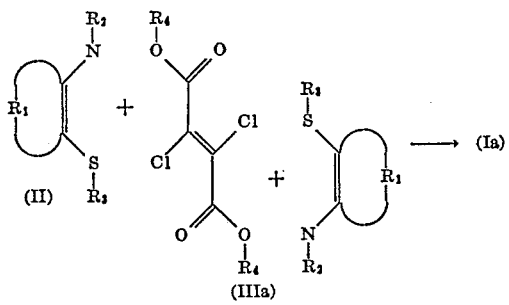

If $R_3$ in Formula II represents a metal equivalent, the first choice as $R_3$ is between sodium, potassium, ammonium, zinc or magnesium equivalent.

The corresponding derivatives of maleic (III) and fumaric acid (IIIa) are suitable compounds of Formulae III and IIIa.

The condensation reaction is carried out preferably in carboxylic acid medium, acetic acid being best, at temperatures ranging from about 80° to 200° C. The carboxylic (acetic) acid serves as solvent and at the same time acts as a catalyst. Condensation can, however, be carried out in an inert solvent such as xylene or a xylene mixture, nitrobenzene, chlorobenzene, dimethyl formamide or dimethyl acetamide etc., optionally in the presence of acid binding agents, for example alkali carbonate, bicarbonate, acetate or hydroxide. According to the meanings of $R_3$ and $R_4$, water, alcohol, hydrogen halide or a salt of a hydrochloric acid is set free in the reaction.

In view of the excellent heat stability and light fastness shown by the compounds of this invention, it is believed that they are present in part or even predominantly in the trans-form and thus correspond to Formula Ia. This assumption is supported by the experience that the indigoid compounds largely exist in the trans-form.

Subsequent to condensation, further substituents can be introduced into the compounds of Formula I or Ia by standard methods such as halogenation or nitration.

The new compounds produced according to this invention, especially after preparation by the normal methods for pigments, are suitable for the mass pigmentation of synthetic polymers, synthetic resins and regenerated fibres in the presence or absence of solvents. These materials include oil, water and solvent based surface coatings, polyester spinning melts, viscose rayon and cellulose acetate spinning solutions, polyethylene, polystyrene and polyvinyl chloride moulding materials, rubber and synthetic leather. Further, the pigments can be used for the manufacture of printing inks, for the mass coloration of paper and for coatings and printing textiles.

On the aforenamed substrates these pigments are outstandingly resistant to migration and fast to light, and show very good fastness to washing, chlorite, hypochlorite and peroxide bleaching, cross dyeing, blind vats, rubbing, overspraying and solvents. They are notable for high tinctorial power, good transparency and good heat stability.

In the following examples the parts and percentages are by weight and the temperatures in the degrees centigrade. The parts by volume relate to the parts by weight as litres relate to kilogrammes.

EXAMPLE 1

A solution of 250 parts of ortho-aminothiophenol in 500 parts of acetic acid is added in 30 minutes with stirring to a solution of 167 parts of dichloromaleic acid in 1500 parts of acetic acid. With continued stirring, the mixture is kept for 1 hour at room temperature, then brought to the boil and boiled for 24 hours with reflux. On cooling the bis-[(2H)-1,4-benzothiazin-3-on-2-ylidene] is obtained in almost pure form and in about 70% yield. It pigments polyvinyl chloride in deep orange shades which have very good light, heat and migration resistance.

EXAMPLE 2

The pigment produced as in Example 1 can be brominated as follows (which causes a shift of shade to reddish orange): 9.5 parts of bis-[(2H)-1,4-benzothiazin-3-on-2-ylidene] are dissolved in 500 parts of concentrated sulphuric acid and 25.6 parts of bromine are slowly added thereto with stirring. The mixtue is further stirred at room temperature for one hour and then unloaded into about 2000 parts of ice-water. The precipitate is filtered and washed free of acid. In this way dibromo bis-[(2H)-1,4-benzothiazin - 3 - on-2-ylidene] is obtained in over 90% yield. Its pigmentary qualities correspond to those of the starting product, in relation to which it has a redder shade.

EXAMPLE 3

A mixture of 25 parts of 2-amino-6-ethoxybenzothiazole and 250 parts of 50% potassium hydroxide solution is boiled for 6 hours under reflux, cooled to room temperature, diluted with 100 parts of water and filtered. The filtrate is adjusted to about pH 6 with concentrated hydrochloric acid and filtered again, after which a solution of 12 parts of dichloromaleic anhydride in 150 parts of ethanol is added at room temperature with stirring. The reaction mixture is stirred for 2 hours at room temperature, diluted with about 600 parts of acetic acid and heated to boil for another 24 hours with reflux. It is filtered hot and the filter residue washed with ethanol and dried. The product is 7,7' - diethoxy-bis-[(2H)-1,4-benzothiazin-3-on-2-ylidene] of formula

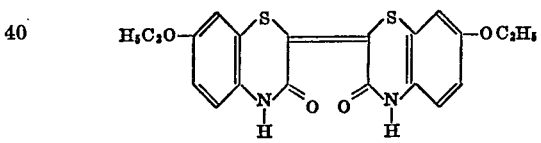

(or its trans-isomer form). It is obtained in over 60% yield and pigments polyvinyl chloride in orange shades which have excellent fastness properties.

The same compound is obtained when the zinc salt of 2-amino-5-ethoxythiophenyl is reacted with dichloromaleic anhydride in accordance with Example 1.

EXAMPLE 4

100 parts of the zinc salt of 2-amino-3-methyl-5-chlorothiophenol are dissolved in 1000 parts of dimethyl formamide at room temperature and to this solution is added in 30 minutes a solution of 42 parts of 2,3-dichloromaleic anhydride in 1000 parts of acetic acid, with constant stirring. The mixture is stirred for a further 2 hours at room temperature and then for one hour at 120°. On cooling to room temperature 100 parts of concentrated hydrochloric acid are added, after which the mixture is again raised to 120°. This temperature is maintained for one hour. The reddish yellow pigment 5,5'-dimethyl-7,7'-dichloro-bis-[(2H)-1,4-benzothiazin - 3 - on - 2 - ylidene] formed settles out and is isolated by filtration from the hot medium, washed with dimethyl formamide and alcohol and dried. The yield is approximately 60%. The pigment melts above 300°.

EXAMPLE 5

126 parts of the zinc salt of 2-amino-3-methoxy-5-thiophenol are dissolved in 1000 parts of dimethyl formamide and 100 parts of hydrochloric acid at room temperature with stirring. With continued stirring, a solution of 50 parts of 2,3-dichloromaleic anhydride in 500 parts of dimethyl formamide is added at the same temperature in the course of 30 minutes. The temperature is then raised slowly to 120° and held at this temperature for two hours with stirring. The pigment 5,5'-dimethoxy-7,7'-dichloro-bis-[(2H)-1,4-benzothiazin-3-on-2-ylidene] after precipitation is filtered hot and washed with dimethyl formamide and ethanol. The pigment, which is obtained in a yield of over 50%, produces deep yellow to orange shades in polyvinyl chloride.

EXAMPLE 6

A mixture of 16.5 parts of sodium sulphide and 4 parts of sulphur in 150 parts of ethanol is added at room temperature to a stirred solution of 56 parts of 4-chloro-3-nitrobenzotrifluoride in 100 parts of ethanol. After the addition is completed the mixture is stirred further with heating and refluxed for 3 hours. Upon cooling bis-(4-trifluoromethyl-2-nitrophenyl) - 1,1 - disulphide settles out. The compound is isolated by filtration, washed with a little alcohol and water and dried.

With thorough stirring, 47.5 parts of the bis-(4-trifluoromethyl-2-nitrophenyl)-1,1-disulphide are suspended in 1300 parts of acetic acid at room temperature, followed by 50 parts of about 35% hydrochloric acid. The temperature is raised to 60° and 100 parts of zinc powder are added in small portions so that the temperature remains at 60–65°. After the addition is complete, the mixture is stirred for a further hour at 60–65°; then heated to the refluxing temperature and stirred for another hour. The zinc salt of 4-tifluoromethyl-2-aminothiophenol precipitates together with the unreacted zinc powder. It is separated by filtration at room temperature; 4-trifluoromethyl-2-aminothiophenol then being extracted from the mixture with 1200 parts of dimethyl formamide. The zinc salt can be recovered by precipitation with 2200 parts of water.

A mixture of 14.7 parts of the zinc salt of 4-trifluoromethyl-2-aminothiophenol thus obtained and 8.7 parts of dichloromaleic anhydride in 400 parts of acetic acid is heated to reflux temperature and held at this temperature for 17 hours with stirring. The resulting pigment 6,6'-di-(trifluoromethyl)-bis-[(2H) - 1,4 - benzothiazin-3-on-2-ylidene] is worked up as described in Example 5. It is obtained in a yield greater than 50% of theory and produces golden yellow shades in polyvinyl chloride.

EXAMPLE 7

70.8 parts of dichlorobenzothiazatolium chloride (cf. Chemical Review, 57, 1011, 1957) are suspended in 700 parts of water at 0–10° and the suspension stirred for 2 hours at room temperature. The hydrolyzed product is separated and washed free of water with ice-cold water. The moist filter-cake is again suspended in 700 parts of ice-cold water, then a solution of 175 g. of sodium hydroxide in 505 parts of water is slowly added within 30 minutes with stirring. The mixture is further stirred for 2 hours at 50–60°, filtered hot, cooled to room temperature and adjusted to pH 8 with dilute hydrochloric acid. A solution of 90 parts of zinc chloride in 200 parts of water is dropped into it, upon which the zinc salt of dichloro-o-aminothiophenol precipitates out. The pH is adjusted to 5 with acetic acid and the precipitate collected by filtration and washed with ice-cold water.

The zinc salt of the dichloro-o-aminothiophenol is condensed with dichloromaleic anhydride as described in Examples 5 and 6. A pigment tetrachloro-bis-[(2H)-1,4-benzothiazin-3-en-2-ylidene] is obtained in about 65% yield which has a yellowish red shade in polyvinyl chloride.

In the following tables a substantial number of further pigments are specified which are of formula

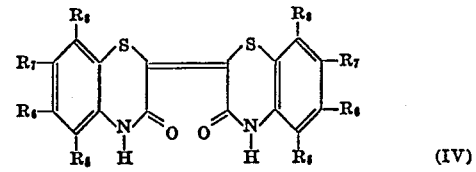

(IV)

or are obtained in the trans-isomer form (IVa).

TABLE 1

| Example number: | $R_5$ | $R_6$ | $R_7$ | $R_8$ | Shade in PVC |
|---|---|---|---|---|---|
| 8 | H | H | Br | H | Orange. |
| 9 | H | H | Cl | H | Do. |
| 10 | Br | H | H | H | Do. |
| 11 | Cl | H | H | Br | Do. |
| 12 | H | H | H | Br | Red. |
| 13 | H | H | H | Cl | Yellow. |
| 14 | Br | H | Br | H | Red. |
| 15 | H | Br | H | Br | Red. |
| 16 | H | Cl | H | Cl | Red. |
| 17 | Cl | H | Cl | H | Yellow. |
| 18 | Cl | H | H | Cl | Red. |
| 19 | Br | H | H | Br | Red. |
| 20 | H | Br | Br | Br | Bordeaux. |
| 21 | H | Cl | Cl | Cl | Do. |
| 22 | Br | Br | Br | H | Do. |
| 23 | Cl | Cl | Cl | H | Do. |
| 24 | Cl | H | —CH$_3$ | H | Red. |
| 25 | Br | H | —CH$_3$ | H | Red. |
| 26 | —CH$_3$ | H | Cl | H | Yellow. |
| 27 | —CH$_3$ | H | Br | H | Do. |
| 28 | H | Cl | H | —CH$_3$ | Do. |
| 29 | H | Br | H | —CH$_3$ | Red. |
| 30 | Cl | H | H | —CH$_3$ | Red. |
| 31 | Br | H | H | —CH$_3$ | Red. |
| 32 | —CH$_3$ | H | H | Cl | Red. |
| 33 | —CH$_3$ | H | H | Br | Red. |
| 34 | H | H | Cl | —CH$_3$ | Red. |
| 35 | H | H | Br | —CH$_3$ | Red. |
| 36 | Cl | H | H | H | Red. |
| 37 | Br | H | H | H | Red. |
| 38 | H | —CH$_3$ | H | H | Orange. |
| 39 | H | H | —CH$_3$ | H | Do. |
| 40 | —CH$_3$ | H | Cl | —CH$_3$ | Yellow. |
| 41 | —CH$_3$ | H | Br | —CH$_3$ | Do. |
| 42 | —CH$_3$ | Cl | H | —CH$_3$ | Orange. |
| 43 | —CH$_3$ | Br | H | —CH$_3$ | Do. |
| 44 | H | H | —OCH$_3$ | H | Orange. |
| 45 | Cl | H | —OCH$_3$ | H | Red. |
| 46 | Cl | H | —OC$_2$H$_5$ | H | Red. |
| 47 | Br | H | —OCH$_3$ | H | Red. |
| 48 | Br | H | —OC$_2$H$_5$ | H | Red. |
| 49 | —OCH$_3$ | H | Cl | H | Red-orange. |
| 50 | —OC$_2$H$_5$ | H | —Cl | H | Red-orange. |
| 51 | —OCH$_3$ | H | Br | H | Do. |
| 52 | —OC$_2$H$_5$ | H | Br | H | Do. |

TABLE 1—Continued

| Example number: | $R_5$ | $R_6$ | $R_7$ | $R_8$ | Shade in PVC |
|---|---|---|---|---|---|
| 53 | H | —NO₂ | —OCH₃ | H | Brown. |
| 54 | H | —NO₂ | Cl | H | Do. |
| 55 | H | —NO₂ | Br | H | Do. |
| 56 | H | H | —NH₂ | H | Red. |
| 57 | H | Br | —NH₂ | H | Red. |
| 58 | H | Cl | —NH₂ | H | Red. |
| 59 | H | —NO₂ | H | H | Brown. |
| 60 | H | —NH₂ | H | H | Do. |
| 61 | H | —NHCOCH₃ | H | H | Bordeaux. |
| 62 | H | —NH₂ | Cl | H | Blue. |
| 63 | H | —NHCOC₆H₅ | Cl | H | Bordeaux. |
| 64 | H | —NHCOC₆H₅ | H | H | Do. |
| 65 | H | H | —COOC₂H₅ | H | Orange. |
| 66 | H | H | —COOCH₃ | H | Do. |
| 67 | H | —COOC₂H₅ | H | H | Do. |
| 68 | H | —COOCH₃ | H | H | Do. |
| 69 | H | H | —CONH₂ | H | Do. |
| 70 | H | —CONH₂ | H | H | Do. |
| 71 | H | H | —CONHC₆H₅ | H | Do. |
| 72 | H | H | —CONHCH₃ | H | Do. |
| 73 | H | H | —CONH—(2,4-Cl₂-C₆H₃) | H | Do. |
| 74 | H | H | —CONH—(2-Cl-C₆H₄) | H | Do. |
| 75 | H | H | —CONH—(3,4-(H₅C₂OCO)₂-C₆H₃) | H | Do. |
| 76 | H | H | —CONH—(3,4-(H₃COCO)₂-C₆H₃) | H | Do. |
| 77 | H | H | —CO—NH—(3,4-(H₂NCO)₂-C₆H₃) | H | Do. |
| 78 | —CH₃ | Cl | H | Cl | Red. |
| 79 | —CH₃ | Br | H | Br | Red. |
| 80 | —CH₃ | Cl | H | —OCH₃ | Bordeaux. |
| 81 | H | —OCH₃ | Cl | Cl | Red. |
| 82 | H | —OC₂H₅ | Cl | Cl | Red. |
| 83 | H | H | —SCH₃ | H | Orange. |
| 84 | H | H | —SC₂H₅ | H | Do. |
| 85 | H | H | —SO₂CH₃ | H | Do. |
| 86 | H | H | —SO₂C₂H₅ | H | Do. |
| 87 | —SO₂CH₃ | H | Cl | H | Do. |
| 88 | Cl | H | —SO₂CH₃ | H | Do. |
| 89 | H | —CF₃ | H | Cl | Yellow. |
| 90 | Cl | H | Cl | Cl | Do. |
| 91 | Br | H | H | Br | Do. |
| 92 | H | H | Cl | H | Orange. |
| 93 | OCH₃ | H | Cl | OCH₃ | Yellow. |
| 94 | CH₃ | H | CH₃ | H | Orange. |
| 95 | H | OCH₃ | H | CH₃ | Yellow/brown. |
| 96 | OCH₃ | H | Cl | CH₃ | Yellow. |
| 97 | OCH₃ | Cl | Cl | OCH₃ | Do. |

The pigments enumerated in Table 2 below are of Formula IV or IVa and can be produced in analogy with the procedures of Example 1 or 2. The halogen atoms, whose positions have not been determined, are introduced in accordance with the procedure of Example 2.

Table 3 following lists various substituents $R_1$ which may occur in pigments of Formula I and Ia produced in conformity with this invention. Here $R_2$ is in each instance hydrogen.

TABLE 2

| Example number: | $R_5$ | $R_6$ | $R_7$ | $R_8$ | Shade in PVC |
|---|---|---|---|---|---|
| 98 | Cl | Cl | Cl | Cl | Orange. |
| 99 | Br | Br | Br | Br | Do. |
| 100 | Cl | Cl | Cl | Cl | Red. |
| 101 | Br | Br | Br | Br | Red. |
| 102 | Cl | Cl | —OCH₃ | —OCH₃ | Red. |
| 103 | Br | Br | —OCH₃ | —OCH₃ | Red. |
| 104 | Cl | Cl | —CH₃ | —CH₃ | Red. |
| 105 | Br | Br | —CH₃ | —CH₃ | Red. |
| 106 | Cl | Cl | —SCH₃ | —SCH₃ | Red. |
| 107 | Br | Br | —SC₂H₅ | —SC₂H₅ | Red. |
| 108 | Cl | Cl | —SO₂CH₃ | —SO₂CH₃ | Red. |
| 109 | Br | Br | —SO₂CH₃ | —SO₂CH₃ | Red. |
| 110 | Cl | Cl | —OC₂H₅ | —OC₂H₅ | Red. |
| 111 | Br | Br | —OC₂H₅ | —OC₂H₅ | Red. |
| 112 | —NH₂ | —NH₂ | Cl | Cl | Blue. |
| 113 | —NH₂ | —NH₂ | Br | Br | Do. |
| 114 | Br | Br | —OCH₃ | —OCH₃ | Bordeaux. |
| 115 | Br | Br | —CH₃ | —CH₃ | Do. |
| 116 | Br | Br | —OCH₃ | —OCH₃ | Do. |
| 117 | | Cl, CH₃ | | | Orange. |
| 118 | | Cl, OCH₃ | | | Yellow/brown. |

TABLE 3

| Example number: | R₁ | Shade in PVC |
|---|---|---|
| 119 | 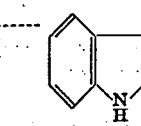 | Bordeaux. |
| 120 | 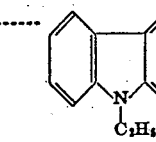 | Do. |
| 121 | 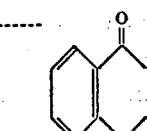 | Do. |
| 122 | 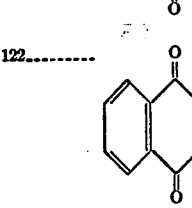 | Brown. |
| 123 | 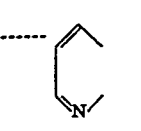 | Orange. |
| 124 | 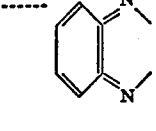 | Do. |
| 125 | 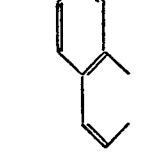 | Red. |
| 126 | 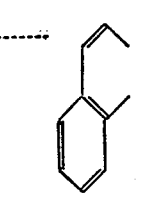 | Brown. |
| 127 | 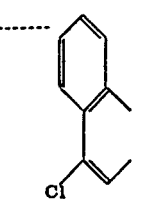 | Do. |
| 128 | 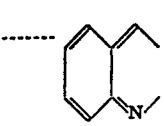 | Do. |

Having thus disclosed the invention what I claim is:

1. A compound of the formula

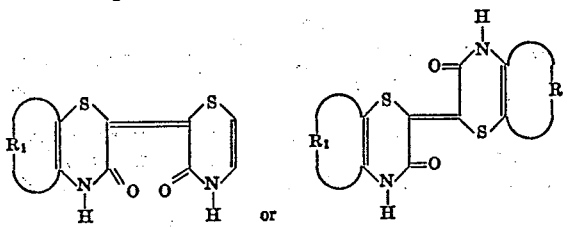

wherein each $R_1$ is independently the group of atoms necessary to complete the formation of a substituted or unsubstituted condensed ring system selected from the group consisting of benzo, naphtho, anthraquino, pyrido, benzopyrido, quinoxalino, carbazolo and 1,4-dioxonaphthio;

any substituent on R or $R_1$ is halo, nitro, cyano, alkyl, alkoxy, amino, mono- or dialkylamino, mono- or diphenylamino, alkylthio, phenoxy, phenylthio, acyl, acylamino or acyloxy;

any alkyl, alkoxy, alkylthio or alkylamino group contains 1 to 4 carbon atoms and may itself be substituted by halo, cyano, alkenyl, alkoxy, amino, mono- or dialkylamino, phenyl phenoxy, mono- or diphenylamino, acyl, acyloxy or acylamino; and any acyl group is of the formula R—Y— or R'—Z— wherein

R is substituted or unsubstituted and is alkyl or phenyl;
Y is —O—CO— or —SO₂—;
R' is hydrogen or R;
Z is —CO—, —NR''CO— or —NR''SO₂—; and
R'' is hydrogen or R.

2. A compound according to claim 1 wherein each $R_1$ is the same.

3. A compound according to claim 2 wherein $R_1$ is substituted or unsubstituted and is benzo, naphtho or anthraquino.

4. A compound according to claim 3 wherein $R_1$ is substituted or unsubstituted benzo.

5. A compound according to claim 2 wherein $R_1$ is

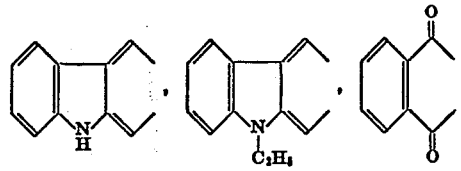

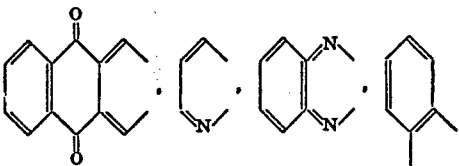

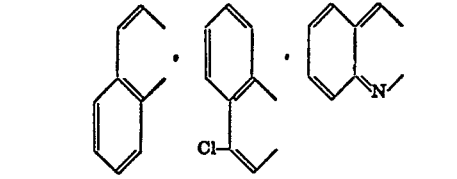

or the atoms necessary to form a condensed benzene ring which benzene ring may be substituted by bromine, chlorine, methyl, methoxy, ethoxy, $SCH_3$, $SC_2H_5$, $CF_3$, nitro, amino, $NHCOCH_3$, $NHCOC_6H_5$, $SO_2CH_3$, $SO_2C_2H_5$, $COOCH_3$, $COOC_2H_5$, $CONH_2$, $CONHCH_3$, or $CONHC_6H_5$ in which the phenyl ring is unsubstituted or substituted once or twice by chlorine, $COOCH_3$, $COOC_2H_5$, or $CONH_2$.

6. A compound according to claim 5 wherein $R_1$ is a substituted or unsubstituted condensed benzene ring.

7. A compound of formula

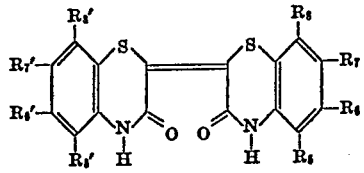

(IV)

or

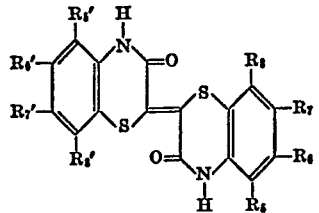

(IVa)

where $R_5$ to $R_8$ and $R_5'$ to $R_8'$ stand for hydrogen, chlorine, bromine, trifluoromethyl, lower alkyl with 1 to 4 carbon atoms or lower alkoxy with 1 to 4 carbon atoms.

8. Bis-[(2H)-1,4-benzothiazin-3-on-2-ylidene] or the trans isomer thereof.

9. Dibromo-bis-[(2H)-1,4-benzothiazin-3-on-2-ylidene] or the trans isomer thereof.

10. 7,7'-diethoxy-bis-[(2H)-1,4-benzothiazin-3-on-2-ylidene] or the trans isomer thereof.

11. 5,5'-dimethyl-7,7'-dichloro-bis-[(2H)-1,4-benzothiazin-3-on-2-ylidene] or the trans isomer thereof.

12. 5,5'-dimethoxy-7,7'-dichloro-bis-[(2H)-1,4-benzothiazin-3-on-2-ylidene] or the trans isomer thereof.

13. 6,6'-di-(trifluoromethyl)-bis-[(2H)-1,4-benzothiazin-3-on-2-ylidene] or the trans isomer thereof.

14. Tetrachloro-bis-[(2H)-1,4-benzothiazin-3-on-2-ylidene] or the trans isomer thereof.

References Cited

UNITED STATES PATENTS 3,408,348   10/1968   Martin et al. _____ 260—243

JOHN M. FORD, Primary Examiner

U.S. Cl. X.R.

106—288 Q